United States Patent
Demirors et al.

(10) Patent No.: US 6,545,090 B1
(45) Date of Patent: Apr. 8, 2003

(54) MONOVINYLIDENE AROMATIC POLYMERS WITH IMPROVED PROPERTIES AND A PROCESS FOR THEIR PREPARATION

(75) Inventors: Mehmet Demirors, Midland, MI (US); David Schrader, Midland, MI (US); Jose M. Rego, Heikant (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/714,306

(22) Filed: Nov. 16, 2000

Related U.S. Application Data

(60) Provisional application No. 60/172,103, filed on Dec. 23, 1999.

(51) Int. Cl.$^7$ .................................................. C08L 51/04
(52) U.S. Cl. ............................... 525/70; 525/71; 525/86
(58) Field of Search ............................... 525/70, 71, 86

(56) References Cited

U.S. PATENT DOCUMENTS

| | | | |
|---|---|---|---|
| 4,146,589 A | 3/1979 | Dupre | |
| 4,153,645 A | 5/1979 | Lanza | |
| 4,214,056 A | 7/1980 | Lavengood | |
| 4,334,039 A | 6/1982 | Dupre | |
| 4,493,922 A | 1/1985 | Echte et al. | |
| 5,264,492 A | 11/1993 | Demirörs | |
| 5,981,667 A | 11/1999 | Asakura et al. | |

FOREIGN PATENT DOCUMENTS

| | | |
|---|---|---|
| EP | 048389 | 1/1985 |
| EP | 158258 | 10/1985 |
| EP | 096447 | 9/1986 |
| EP | 015752 | 8/1988 |
| EP | 152752 | 8/1988 |
| EP | 418042 | 2/1994 |
| EP | 277687 | 12/1998 |
| JP | 61-148213 | 11/1994 |
| JP | 62-179542 | 1/1995 |
| JP | 04-100810 | 6/1998 |
| WO | WO 98/32797 | 7/1998 |

*Primary Examiner*—Jeffrey Mullis

(57) ABSTRACT

The present invention is a rubber modified monovinylidene aromatic polymer comprising:
  a) a monovinylidene aromatic polymer matrix,
  b) rubber particles dispersed therein, characterized in that the rubber particles are produced from a diene rubber having I) a high molecular weight component and II) a low molecular weight component; the high molecular weight component having a weight average molecular weight at least two and one half times greater than the weight average molecular weight of the low molecular weight component, wherein both components I and II have a 1,4 cis content of greater than 70 percent and III) the rubber is grafted with monovinylidene aromatic polymer to the extent that there is at least 30 percent monovinylidene aromatic polymer present as grafts on the rubber.

12 Claims, No Drawings

MONOVINYLIDENE AROMATIC POLYMERS WITH IMPROVED PROPERTIES AND A PROCESS FOR THEIR PREPARATION

CROSS REFERENCE STATEMENT

This application claims the benefit of U.S. Provisional Application No. 60/172,103, filed Dec. 23, 1999.

BACKGROUND OF THE INVENTION

The present invention relates to rubber-reinforced monovinylidene aromatic polymer compositions of the type commonly referred to as "high impact polystyrene" or "HIPS". More particularly, the invention relates to such compositions in which the rubber-reinforcing particles are produced from a specific polybutadiene rubber, have a specific particle size distribution and a process for the production of such compositions.

Rubber-reinforced polymer compositions of the HIPS type are widely used in many applications because of their ease of molding, good gloss, and generally good mechanical properties. It has been known for some time that improved combinations of gloss and mechanical properties can be achieved in such rubber-reinforced polymers by providing a so-called "bimodal" distribution in the sizes of the rubber reinforcing particles, i.e. the particles show two distinct peaks in their size distribution. This can be achieved by combining two or more such resins or components, each having a group of rubber particles having a different average particle size. Various monovinylidene aromatic polymer compositions are known having at least two groups of rubber particles wherein the groups have different average particle sizes. See for example U.S. Pat. Nos. 4,146,589; 4,214,056 and 4,334,039 and European Patents 0 096 447, 0 158 258 and 0 152 752 which disclose such compositions.

U.S. Pat. No. 4,493,922 also discloses rubber-reinforced polystyrene compositions having bimodal rubber particle size distributions. The average rubber particle sizes disclosed for the groups of particles are 2 to 8 micrometers (especially from 5 to 6 micrometers) for the group of larger particles and 0.2 to 0.6 micrometers for the group of smaller particles.

As mentioned, a number of methods are proposed for achieving such a bimodal particle distribution. For example, U.S. Pat. No. 4,153,645 discloses a method for the preparation of a HIPS-type polymer in which two polymer compositions are prepared using standard production processes, the compositions having different average particle sizes. These two polymer compositions are then mixed by a subsequent mechanical blending process.

An alternative approach to producing HIPS polymers with a bimodal rubber distribution has been to introduce feed streams of monomer and rubber at two different points in the polymerization system. This results in a polymer product which generally has a fairly broad spread of rubber particle sizes. Examples of this are described in U.S. Pat. No. 4,334,039 and EP 0 096 447. A disadvantage of such methods is that the mechanical properties of the resulting product can be somewhat poor and difficult to control.

Yet a further approach is disclosed in U.S. Pat. No. 4,146,589 and EP 0 048 389. In this method, two prepolymer compositions are prepared containing rubber particles with different particle sizes. The prepolymer compositions are then mixed and further polymerized to provide a polymer having a bimodal particle size distribution.

Other references in this area include EP-418,042 wherein the rubber comprises a partially coupled radial or star rubber, having a cis content of less than or equal to about 70 percent, JP 02762722 wherein the rubber is a mixture of a high cis polybutadiene of high molecular weight and a low cis polybutadiene of low molecular weight, and JP 95005789 wherein the rubber is a mixture of a high molecular weight polybutadiene and a low molecular weight polybutadiene, both having a cis structure of greater than 80%. However, a desirable balance of impact strength and tensile modulus is still not attained for some specific applications.

Therefore, it is still desirable to obtain a rubber modified monovinylidene aromatic polymer having an improved balance of impact and tensile properties for select applications.

SUMMARY OF THE INVENTION

The present invention is a rubber modified monovinylidene aromatic polymer comprising:
  a) a monovinylidene aromatic polymer matrix,
  b) rubber particles dispersed therein, characterized in that the rubber particles are produced from a diene rubber having I) a high molecular weight component and II) a low molecular weight component; the high molecular weight component having a weight average molecular weight at least two and one half times greater than the weight average molecular weight of the low molecular weight component, wherein both components I and II have a 1,4 cis content of greater than 70 percent and III) the rubber is grafted with monovinylidene aromatic polymer to the extent that there is at least 30 percent monovinylidene aromatic polymer present as grafts on the rubber.

In a preferred embodiment the present invention is a rubber modified monovinylidene aromatic polymer comprising:
  a) a monovinylidene aromatic polymer matrix,
  b) rubber particles dispersed therein in the form of small and large particles, wherein the volume average particle diameter of the small particles is from about 0.1 to about 2 micrometers and the volume average particle diameter of the large particles is from about 2 to about 6 micrometers, characterized in that the rubber particles are produced from a diene rubber having I) a high molecular weight component and II) a low molecular weight component; the high molecular weight component having a weight average molecular weight at least two and one half times greater than the weight average molecular weight of the low molecular weight component, wherein both components I and II have a 1,4 cis content of greater than 70 percent and III) the rubber is grafted with monovinylidene aromatic polymer to the extent that there is at least 30 percent monovinylidene aromatic polymer present as grafts on the rubber.

Another aspect of the present invention is a process for preparing a rubber-modified monovinylidene aromatic polymer comprising the steps of: (a) continuously supplying a reaction mixture comprising monovinylidene aromatic monomer and a dissolved diene rubber to a reactor means, (b) continuously polymerizing the monovinylidene aromatic monomer in the presence of the dissolved diene rubber in the reactor means under conditions whereby phase inversion subsequently occurs, (c) continuously removing from the reactor means a diene rubber-reinforced monovinylidene aromatic polymer, which process is characterized in that: (d) the diene rubber which is dissolved in the reaction mixture has distinct high and low molecular weight components, the high molecular weight component having a weight average molecular weight at least two and one half times greater than the weight average molecular weight of the low molecular weight component, both components having a 1,4 cis content of greater than 70 percent.

In a preferred embodiment, the process further comprises (e) wherein the process conditions prior to phase inversion are adjusted to produce different groups of diene rubber particles from the high and low molecular weight components of the diene rubber, each group having a different average rubber particle size.

DESCRIPTION OF THE PREFERRED EMBODIMENTS

Monovinylidene aromatic polymers suitable for the present invention are those produced by polymerizing a vinyl aromatic monomer. Vinyl aromatic monomers include, but are not limited to those described in U.S. Pat. Nos. 4,666,987, 4,572,819 and 4,585,825, which are herein incorporated by reference. Preferably, the monomer is of the formula:

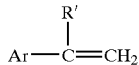

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. It is preferred, however, for the practice of the present invention to use either less than about 10 percent by weight or substantially no other copolymerizable monomer. The specified particle size distribution is no longer optimal for larger amounts of one or more of these monomers. In general, the preferred monovinylidene aromatic monomers are styrene, alpha methyl styrene, one or more of the vinyl toluene isomers, and/or mixtures of two or more of these, with styrene being the most preferred monovinylidene aromatic compound.

The monovinylidene aromatic polymer typically has a weight average molecular weight (Mw) of from approximately 120,000 to 500,000.

The rubbers preferably employed in the practice of the present invention are those polymers and copolymers which exhibit a second order transition temperature which is not higher than about 0° C., preferably not higher than about −200° C. and more preferably not higher than about −400° C. as determined or approximated using conventional techniques, e.g., ASTM Test Method D-746-52 T.

Highly preferred rubbers are alkadiene polymers. Suitable alkadienes are 1,3-conjugated dienes such as butadiene, isoprene, chloroprene or piperylene. Most preferred are homopolymers (excepting any coupling monomers) prepared from 1,3-conjugated dienes, with such homopolymers of 1,3-butadiene being especially preferred. Alkadiene copolymer rubbers containing small amounts, for example less than 15, preferably less than 10 weight percent, of other monomers such as monovinylidene aromatics can also be employed if the rubbers meet the other qualifications described herein. The most preferred rubbers are the radial or star homopolymers of 1,3-butadiene which have a cis content of at least 70 percent and a high molecular weight component Mw of from about 100,000 to about 1,000,000.

Preferably the rubber material has a relatively high total average molecular weight and a relatively low total solution viscosity and Mooney viscosity, including both the high and low molecular weight components. In general, the solution viscosity for the rubbery materials will be desirably below about 300 centipoise while the Mooney viscosity will be less than about 150 (ML 4+1). As known by those skilled in the art, various techniques such as control of the branching and molecular weight control can be used to adjust and tailor these polymers to achieve the optimum solution and Mooney viscosities. The solution viscosity of a radial-type alkadiene polymer will generally be less than a linear polymer or copolymer of the same monomeric components and same molecular weights.

Regarding the rubber materials suitable for use according to the present invention, the essential requirement for the rubber material is that it has a relatively high molecular weight component and a relatively low molecular weight component, wherein both components have a 1,4 cis content of at least 70 percent. Suitable rubbers for use herein are the partially coupled rubbers, also called radial or star rubbers, completely coupled rubbers as well as randomly branched rubbers, other branched polymers and blends of rubbers, such as a blend of linear and branched polymers, meeting the requirements for rubber materials to be employed in this invention. The molecules of these rubber materials have three or more polymer segments coupled by a single polyfunctional element or compound. Radial or star polymers having this designed branching are conventionally prepared using a polyfunctional coupling agent. Methods for preparing star or radial polymers having designed branching are well-known in the art. Methods for preparing a polymer of butadiene of this type using a coupling agent are illustrated in U.S. Pat. Nos. 4,183,877, 4,340,690, 4,340,691 and 3,668,162 and Japanese Patent 59-24 711.

Radial or star polymers, and preferably those where the "arm" segments have been partially coupled with tin-based, silicon-based or polyfunctional organic coupling agents, are most preferably employed in the practice of the present invention. The cis content of the star or radial rubbers will advantageously be greater than about 70 percent, preferably greater than 75 percent and most preferably greater than 80 percent as determined by conventional IR spectrometry techniques.

These radial-type polymers have components of relatively high and relatively low molecular weight polymer and, for this reason, typically exhibit two or more molecular weight peaks when molecular weight is plotted on the x-axis against weight percent of the rubber material on the y-axis (i.e., a bimodal molecular weight distribution). As would be expected, one molecular weight peak (the lower molecular weight component) indicates the molecular weight of the uncoupled segments or linear segments or branched polymers with lower molecular weight and a second molecular weight peak (the higher molecular weight component) indicates the molecular weight of the coupled or branched polymer as well as high molecular weight linear polymers.

As used herein, the molecular weights referred to are the weight average molecular weights or Mw's for the rubber components as determined by the gel permeation chromatographic techniques described by ASTM Test Method designated D-3536 (polystyrene standard) and expressed without correction for the differences between rubber and polystyrene standards.

The polymers suitable for use according to the present invention advantageously exhibit a low molecular weight component Mw of at least about 60,000, more preferably at least about 70,000, most preferably at least about 80,000. The ratio of the Mw of the high molecular weight component to the Mw of the lower molecular weight component indicates the degree of coupling. In general, such ratio should be least about 2.5, advantageously from about 3 to about 10, preferably from about 3 to about 9, and most preferably from about 3 to about 8.

In addition, in order to obtain the proper proportions of the small and large rubber particles, it is preferred if the low molecular weight component of the rubber material constitutes from about 20 to about 80 weight percent of the total rubber content of the resin, preferably from about 30 to about 70 weight percent. Most preferably neither component is more than about 80 percent of the total rubber in the composition.

Advantageously, to prepare a rubber-reinforced resin using mass or mass/suspension polymerization techniques, the solution viscosity of the rubber of the radial-type alkadiene polymer, as measured as a 5 weight percent solution in styrene, will be greater than 40 and less than 400 centipoise (cps) at 25° C. when the viscosity is measured using a Canon-Fenske capillary viscometer (Capillary No. 400, 1.92 mm inside diameter). The minimum solution viscosity of the rubber is not particularly critical to the practice of the invention. In a preferred range the solution viscosity of the rubber is at least 65 and most preferably at least about 70 centipoise.

The Mooney viscosity values of the radial-type rubbers should be less than about 65, preferably less than about 90 as measured by DIN 53523. In general, to have a rubber which is sufficiently solid to be handled and processed in a normal fashion, the Mooney viscosity value should be at least about 30 and values of at least about 40 are preferred. The preferred range for the Mooney value is between about 20 and about 90, more preferably between about 30 and about 85, most preferably between about 40 and about 80.

Although the rubber may contain a small amount of a crosslinking agent, excessive crosslinking can result in loss of the rubbery characteristics and/or render the rubber insoluble in the monomer.

The rubber is advantageously employed in amounts such that the rubber-reinforced polymer product contains from about 2 to about 20 percent, preferably from about 3 to about 17 percent, more preferably about 3 to about 15 weight percent rubber or rubber equivalent, based on the total weight of the rubber modified monovinylidene aromatic polymer.

The term "rubber" or "rubber equivalent" as used herein to indicate weight amounts of rubber material is intended to mean, for a rubber homopolymer (such as polybutadiene), simply the amount of rubber, and for a block copolymer, the amount of the copolymer made up from monomer(s) which, when homopolymerized form a rubbery polymer. For example, for calculating the amount of rubber in a composition where a butadiene-styrene block copolymer rubber has been employed, the "rubber" or "rubber equivalent" of the composition is calculated based on only the butadiene component in the block copolymer. Obviously where physical properties or other aspects of the rubber material are measured, the complete rubber material including any comonomers is referred to.

The product of the present invention can be viewed as having a generally broadened rubber particle size distribution. In one embodiment the present invention has a bimodal rubber particle size distribution with a critical amount of large and small rubber particles. The present invention having such distributions results in a resin product which, in the form of molded articles, possesses improved combinations of impact resistance, tensile strength and surface gloss.

In one embodiment, according to this invention, it has surprisingly been discovered that products having a rubber particle size distribution of this type have better combinations of properties when, based on 100 parts by weight rubber or rubber equivalent, (a) particles constituting from about 20 to about 60 parts by weight of the rubber have diameters of from about 0.1 to about 2 micrometers, (b) particles constituting from about 60 to about 20 parts by weight of the rubber have diameters of from about 2 to about 8 micrometers.

In terms of a bimodal distribution, it is found that as groups of particles, the group of smaller particles should have a volume average particle diameter of from about 0.2 to about 2 micrometers, preferably to about 1.8 micrometers and most preferably to about 1.5 micrometers and the group of larger particles should have a volume average particle diameter of from about 2.0, preferably from about 2.5 to about 5 micrometers.

As used herein, the said particle size is the diameter of the rubber particles as measured in the resultant product, including all occlusions of matrix polymer within rubber particles, which occlusions are generally present in the disperse rubber particles of a rubber-reinforced polymer prepared using mass polymerization techniques. Rubber particle morphologies, sizes and distributions may be determined using conventional techniques such as (for larger particles) using a Coulter Counter (Coulter Counter is a Trade Mark) or, particularly for smaller particles, transmission electron microscopy.

Regarding morphology of the rubber particles in the different groups, as is well known, the smaller particles typically have a core-shell (single, major occlusion) or cellular (multiple, minor occlusions) morphology. The larger particles would generally have a cellular or similar multiple-occlusion morphology.

The process of the present invention is characterized by the utilization of a rubber having specific high and low molecular weight components under process conditions whereby the above-specified rubber particle size distribution can be obtained with standard polymerization processes and equipment.

In the preparation of the rubber-reinforced polymers, a reaction mixture is prepared by dissolving the rubber in the monomer(s) and the resulting monomer/rubber solution, referred to herein as the reaction mixture, is supplied to a reactor means and subsequently polymerized. The amount rubber initially dissolved in the reaction mixture is dependent on the desired concentration of rubber in the final rubber-reinforced polymer product, the degree of conversion during polymerization and the viscosity of the reaction mixture solution. Specifically, the viscosity of the reaction mixture solution is advantageously less than about 3000 centipoise. At higher viscosities, the reaction mixture solution is difficult to process. Provided the viscosity of the reaction mixture is not undesirably high, the reaction mixture solution will generally comprise from about 5 to about 15, weight percent of the rubber, said weight percent being based on the total amounts of rubber and monomers employed.

Optionally, the reaction mixture will contain an organic liquid diluent. Organic liquid diluents suitably employed are normally liquid organic materials which do not boil at the polymerization conditions employed and which form a solution with the polymerizable monomer(3) and the polymer prepared therefrom. Representative organic liquid diluents include aromatic (and inertly substituted aromatic) hydrocarbons such as toluene, benzene, ethylbenzene and xylene; saturated or inertly substituted, saturated aliphatics having either straight or branched chains of five or more carbon atoms such as heptane, hexane and octane; alicyclic or inertly substituted alicyclic hydrocarbons having five or six carbon atoms such as cyclohexane. Preferred of such organic liquid diluents are the inertly substituted aromatics, with ethylbenzene and xylene being most preferred. In general, the organic liquid is employed in amounts sufficient to improve the processability and heat transfer during polymerization, e.g., flow characteristics of the polymerization mixture. Such amounts will vary depending on the rubber, monomer and diluent employed, the process equipment and the desired degree of polymerization. In general, if employed, the reaction mixture will normally contain from about 2 to about 30 weight percent of the diluent based on the total weight of the rubber, monomer and diluent.

During the polymerization of the resulting reaction mixture, the polymerization conditions are maintained such that phase inversion subsequently occurs. Under such conditions the monomer is polymerized both with the rubber (grafted) and separately (free polymer), which dissolved rubber thereby becomes grafted with a portion of polymerized monomer. The balance of free polymer, basically incompatible with the rubber, forms a discontinuous smaller volume polymer/monomer phase dispersed throughout the larger volume continuous phase of the monomer/rubber (including grafted rubber) solution.

Eventually, at a point after sufficient amounts of free polymer are formed, the free polymer converts from a discontinuous phase dispersed in the continuous phase of the unpolymerized monomer(s), through a point where there is no distinct continuous or discontinuous phases in the polymerization mixture, to a continuous polymer phase having the rubber dispersed as discrete particles there through. As the polymer/monomer phase becomes the larger volume phase and hence the continuous phase, the grafted rubber forms a discontinuous phase. This is the point in the polymerization when phase inversion occurs and the rubber becomes dispersed in the form of particles through the continuous polymer phase resulting in a product having rubber particles dispersed in a matrix of monovinylidene aromatic polymer.

Preferably, at phase inversion, the rubber is sufficiently grafted such that the disperse rubber particles, following initial sizing, are capable of retaining essentially the same average particle size and morphological properties throughout the remainder of the polymerization process. In a preferred embodiment, the amount of grafted rubber is at least 30 percent of the total rubber at phase inversion. The degree of grafting of the diene rubber at the point of phase inversion has a significant impact on the properties of the resultant rubber modified polymer produced. Generally, the number of grafts per chain contributes to the particle size, the structure and the amount of occluded matrix polymer within the rubber particles. Higher grafting levels results in higher gel content, a larger amount of grafted rubber and higher graft and occluded matrix polymer content within the rubber particles. The increased gel content is highly desirable in that it enables an increased rubber phase volume to be achieved. Increased rubber phase volume can also be achieved by using a high molecular weight polybutadiene rubber, however increasing the molecular weight typically increases the solution viscosity as well, making handling and processing more difficult. This can be avoided by producing a high molecular weight rubber which is branched and has a solution viscosity lower than a linear rubber of the same Mw. Grafting is improved due to the existence of more diene units per rubber molecule. For example, if a rubber has a molecular weight of 200,000 and contains one graft per chain under a specific set of process conditions, doubling the molecular weight will also double the number of grafts per molecule.

When preparing bimodal compositions in the practice of the present invention the polymerization process should be conducted at conditions such that at the point of phase inversion, the high and low molecular weight components of the rubber form separate groups of rubber particles having different average particle sizes.

The polymerization process features that are utilized to achieve the requisite rubber particle distribution include the use of a graft promoting chemical initiator, such as the peroxide initiators including the peresters, e.g., tertiary butyl peroxybenzoate, tertiary butyl peroxyacetate, dibenzoyl peroxide, and dilauroyl peroxide, the perketals, e.g., 1,1-bis tertiary butyl peroxycyclohexane, 1,1-bis tertiary butyl peroxy-3,3,5-trimethyl cyclohexane, and di-cumyl peroxide, and the percarbonates; photo chemical initiation techniques; and the like. Preferred initiators include tertiary butyl peroxy benzoate, 1,1-bis tertiary butyl peroxy cyclohexane 1,1-bis tertiary butyl peroxy-3,3,5 trimethyl cyclohexane and tertiary butyl peroxy acetate.

Initiators may be employed in a range of concentrations dependent on a variety of factors including the specific initiator employed, the desired levels of polymer grafting and the conditions at which the mass polymerization is conducted. Specifically, in the preferred mass polymerization process for preparing rubber-reinforced polymers, from about 50 to about 2000, preferably from about 100 to about 1500, weight parts of the initiator are employed per million weight parts of monomer resulting in a product having rubber particles dispersed in a matrix of monovinylidene aromatic polymer.

With such an initiator the grafting onto the high molecular weight component of the rubber is promoted and multiple grafts are formed. This stabilizes these rubber molecules in the reaction mixture and facilitates the separation of the high molecular weight rubber molecules from the lower molecular weight rubber. This contributes to the formation of the larger rubber particles.

The lower molecular weight component of the rubber, on the other hand, being less grafted, tends to form the smaller particles somewhat later than the larger particles are formed. It is also desirable to facilitate the formation of separate, smaller particles to provide an increased amount of agitation to the reaction mixture during and well after the point of phase inversion. Phase inversion has usually taken place at a point in the polymerization process where the reaction mixture contains a solids level which, in weight percent based on reaction mixture, is about 2.5 or about 3 times the weight content of the added rubber material. Therefore, a relatively high agitation level is preferably maintained until a point in the polymerization process where the reaction mixture contains a solids level which, in weight percent based on reaction mixture, is at least about 3, preferably about 4 times the weight content of the added rubber material.

For example, when there is about 5 to about 10 weight percent rubber added to the reaction mixture, relatively high agitation is maintained until the reaction mixture contains about 30 percent by weight solids. As used herein, the term solids refers to the polymeric components of the reaction mixture such as the rubber which was added initially and the monovinylidene aromatic polymer which has been formed.

Depending upon particular production equipment there may also be other process features that can be utilized to further facilitate the formation of the specified rubber particle size distribution.

In general, continuous methods are employed for mass polymerizing the monovinylidene aromatic compound in the reaction mixture. In the practice of the present invention it is generally preferred to utilize a stratified, linear flow, stirred tower type reactor, also referred to as a plug flow type reactor. Such reactors are well known. See, for example U.S. Pat. No. 2,727,884. Such a process may or may not comprise recirculation of a portion of the partially polymerized product. It has been determined that their utilization to prepare the product according to the present invention in a process of the kind described can provide very substantial improvements in the production process and in the mechanical properties of the product, and in particular in product impact resistance.

An important aspect of such polymerization processes is that a significant portion of the polymerization of the monovinylidene aromatic monomer in the reaction mixture can take place in the presence of the dissolved rubber. Phase inversion and precipitation and dispersion of the rubber particles does not occur until after sufficient grafting of monovinylidene aromatic polymer onto the rubber, which primarily takes place when the rubber is in solution.

This is a major advantage over polymerization in completely mixed, stirred tank type reactors (non-stratified, non-plug flow) which are operated at a predetermined level of conversion. Typically, due to the presence of significant levels of the already polymerized monovinylidene aromatic polymer, the rubber which may be dissolved in the feed stream to such a reactor, is immediately dispersed as particles before graft polymerization can occur and, more importantly, before the high and low molecular weight components of an appropriate rubber material can separate and form separate groups of rubber particles.

Moreover, the process according to the present invention can be practiced advantageously on standard mass polymerization process equipment not otherwise capable of the preparation of monovinylidene aromatic polymers with bimodal rubber particle distributions without significant equipment modifications. Such standard equipment typically utilizes a single supply of the unpolymerized reaction mixture comprising a solution of rubber, monomer, optional diluent and other additives. The reaction mixture is then polymerized as it proceeds through one or a series of such reactor vessels. At the end of the reactor vessel (series) the product is removed and diluent and any residual monomer removed.

The polymerization mixture may also contain other additive materials and/or polymerization aids such as plasticizers or lubricants such as mineral oil, butyl stearate or diethyl phthalate; stabilizers including antioxidants (e.g., alkylated phenols such as di-tert-butyl-p-cresol or phosphates such as trisnonyl phenyl phosphate); chain transfer agent, such as an alkyl mercaptan such as n-dodecyl mercaptan; or mold release agents, e.g., zinc stearate; all of which additives and/or polymerization aids are added to the reaction mixture where appropriate including before, during or after polymerization.

The use of a chain transfer agent is optional and is usually employed only in the production of a composition or prepolymer containing larger size rubber particles (e.g. having an average particle size of at least one micrometer). If employed, the chain transfer agent is generally employed in an amount of from about 0.001 to about 0.5 weight percent based on the total weight of the polymerization mixture to which it is added.

The temperatures at which polymerization is most advantageously conducted are dependent on the specific components, particularly initiator, employed but will generally vary from about 60 to about 190° C.

Crosslinking of the rubber in the resulting product and removal of the unreacted monomers, as well as any reaction diluent, if employed, and other volatile materials is advantageously conducted employing conventional techniques.

The rubber modified monovinylidene aromatic polymer of the present invention has an excellent balance of impact and tensile modulus properties, allowing for its use in various applications including injection molding applications, extrusion applications, foam applications including large appliances, consumer electronics, air conditioners, refrigerators, freezers, small appliances, cassettes, radio, TV, stereo cabinets, furniture and furnishings, toys, housewares, building and construction applications, footwear, medical applications, packaging, disposables such as tumblers, glasses, dishes, cups, bowls, flatware, cutlery, blowmolded items, foam board, sheet, films and the like.

What is claimed is:

1. A rubber modified monovinylidene aromatic polymer comprising:
    a) a monovinylidene aromatic polymer matrix,
    b) rubber particles dispersed therein, characterized in that the rubber particles are produced from a diene rubber having I) a high molecular weight component and II) a low molecular weight component; the high molecular weight component having a weight average molecular weight at least two and one half times greater than the weight average molecular weight of the low molecular weight component and the low molecular weight component constitutes from about 20 to about 80 weight percent of the total rubber content, wherein both components I and II have a 1,4 cis content of greater than 70 percent and III) the rubber is grafted using a graft promoting chemical initiator, with monovinylidene aromatic polymer to the extent that the amount of grafted rubber is at least 30 percent of the total rubber at phase inversion.

2. The rubber modified monovinylidene aromatic polymer of claim 1, wherein the rubber particles are dispersed in the form of small and large particles, wherein the volume average particle diameter of the small particles is from about 0.1 to about 2 micrometers and the volume average particle diameter of the large particles is from about 2 to about 6 micrometers and the small rubber particles are from 20 to 80 weight percent of the total rubber.

3. The rubber modified monovinylidene aromatic polymer of claim 2, wherein the small particles have a volume average particle diameter of from 0.1 micrometers to 1.8 micrometers.

4. The rubber modified monovinylidene aromatic polymer of claim 3, wherein the small particles have a volume average particle diameter of from 0.1 micrometers to 1.5 micrometers.

5. The rubber modified monovinylidene aromatic polymer of claim 1 wherein the monovinylidene aromatic polymer is polystyrene.

6. The rubber modified monovinylidene aromatic polymer of claim 1 wherein the rubber is polybutadiene.

7. The rubber modified monovinylidene aromatic polymer of claim 1, wherein the diene rubber is branched.

8. The rubber modified monovinylidene aromatic polymer of claim 1 wherein the diene rubber has a 1,4 cis content of greater than 80 percent.

9. The rubber modified monovinylidene aromatic polymer of claim 1 wherein the low Mw component has a Mw of at least 60,000.

10. The rubber modified monovinylidene aromatic polymer of claim 1 wherein (a) particles constituting from about 20 to about 60 parts by weight of the rubber have diameters of from about 0.1 to about 2 micrometers, (b) particles constituting from about 60 to about 20 parts by weight of the rubber have diameters of from about 2 to about 6 micrometers.

11. The rubber modified monovinylidene aromatic polymer of claim 1 wherein (a) particles constituting from about 30 to about 50 parts by weight of the rubber have diameters of from about 0.2 to about 2 micrometers, (b) particles constituting from about 50 to about 30 parts by weight of the rubber have diameters of from about 2 to about 6 micrometers.

12. An article produced from the rubber modified polymer of claim 1.

* * * * *